June 19, 1928.

D. DE LANCEY

CAMERA LUCIDA

Filed April 27, 1926

INVENTOR.
Darragh de Lancey
BY
Mayn Warfield Watson
ATTORNEYS.

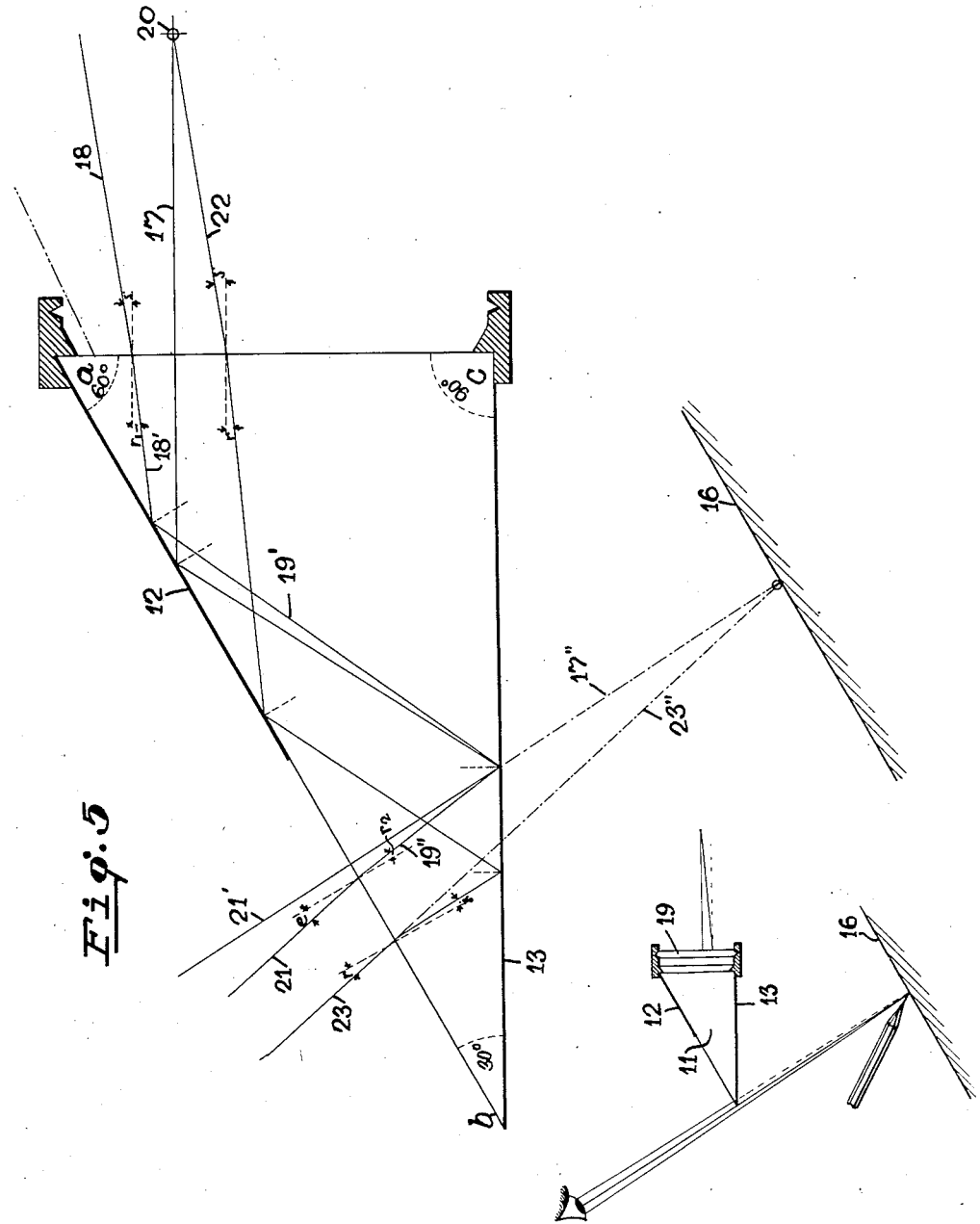

Patented June 19, 1928.

1,674,321

UNITED STATES PATENT OFFICE.

DARRAGH DE LANCEY, OF WATERBURY, CONNECTICUT.

CAMERA LUCIDA.

Application filed April 27, 1926. Serial No. 104,877.

This invention relates to optical instruments, and more particularly to instruments of the type generally known as cameræ lucidæ.

The object generally of the invention is to provide an instrument of the character described which is efficient and economical and is adapted to be operated with a relatively high degree of convenience.

More specifically, the object is to provide an improved prism construction for cameræ lucidæ adapted to give improved definition along with freedom from distortion and chromatic aberration and at the same time afford a convenient angle of vision to the observer who is using a camera lucida; the angle at which the observer looks into the camera lucida being made obliquely inclined to the vertical instead of substantially vertically downward as heretofore.

Other objects of the invention will in part be obvious and will in part appear hereinafter.

It has been customary heretofore to provide cameræ lucidæ with refracting prisms having base angles of forty-five degrees and a vertical angle of ninety degrees having the base or face opposite the ninety degree angle serving as an interior reflecting surface; the base in consequence is generally silvered exteriorly. In such cameræ lucidæ the major portion of the the useful rays in the incoming beam are not normal to the incident face of the prism but meet it at an oblique angle with the result that definition is to some extent interfered with owing to the extreme refraction undergone by the entering rays.

In the practice of the present invention an arrangement of the incident face of the refracting prism is provided such that the major portion of the useful rays do not undergo such extreme refraction but approximate closely the normal. A relation of the refracting faces is also provided whereby distortion and chromatic aberration are at the same time substantially avoided.

The invention accordingly comprises the features of construction, combinations of elements, and arrangement of parts, which will be exemplified in the constructions hereinafter set forth and the scope of the application of which will be indicated in the claims.

This application has been divided, the subject matter divided out of this case being claimed in my copending application, Serial No. 269,732, filed Apr. 13, 1928.

For a fuller understanding of the nature and objects of the invention reference should be had to the following detailed description taken in connection with the accompanying drawing, in which:

Fig. 5 is an explanatory diagram; and

Fig. 6 is a similar diagram on a reduced scale, illustrating the mode of use.

Figure 1:
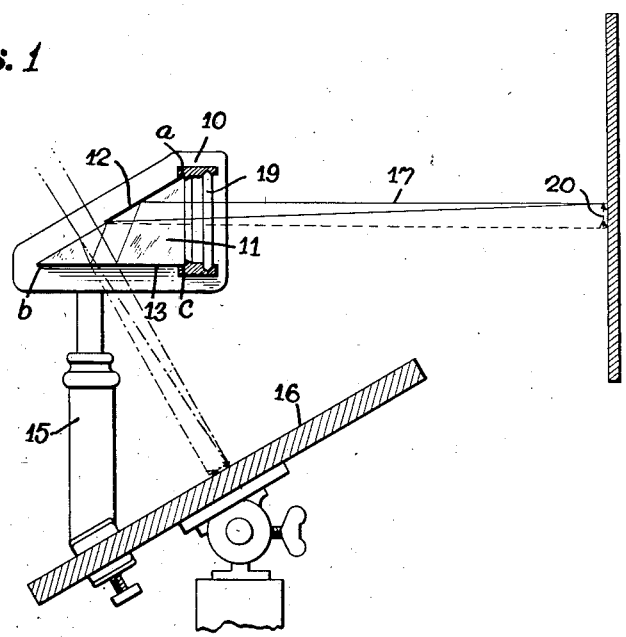
Figure 1 shows, partly in side elevation and partly in section, a camera lucida constructed in accordance with the invention.
Figure 2:
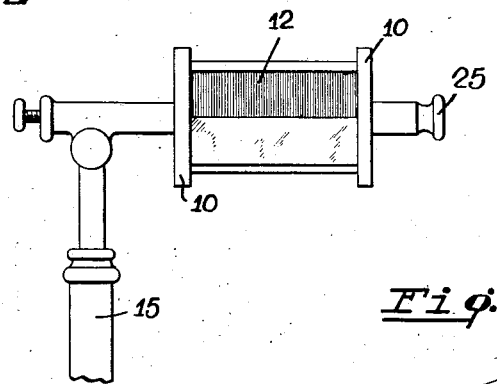
Fig. 2 is a fragmentary front elevation.
Figure 3:
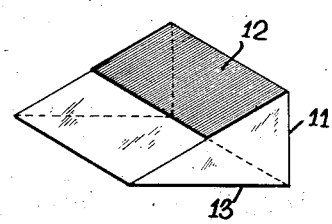
Fig. 3 is a perspective view of the refracting prism for a camera lucida of the present invention.
Figure 4:
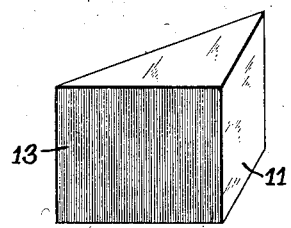
Fig. 4 is a similar view of the prism from a different viewpoint, showing further details of the prism construction.

Referring now to the drawing, and particularly to Fig. 1, 10 denotes a supporting frame for the prism 11 of the camera lucidæ. The prism is itself shown in section and comprises a body of transparent refracting material such as so-called "optical glass"; the section of the prism is here shown as a right triangle, and designated $abc$, the right angle being one of the base angles, but the practice of the invention is by no means limited to the use of right triangles. The upper obliquely inclined face of the prism shown is the refracting face from which the object is viewed, i. e., the one from which the rays of light emerge, and corresponds to the hypotenuse $ab$ or triangle $abc$.

It also serves as a reflecting face for rays within the prism, and to this end is shown as partially covered by a layer of reflecting material, for example silver or mercury; this layer is indicated as a surface 12. The use of such layer however is not essential where the optical glass is chosen with a suitable index of refraction. The whole lower face of the prism, represented by the base $bc$ of the triangle $abc$, is here shown as covered with a layer of reflecting material 13, so that it functions as a reflecting face for rays within the prism.

The prism thus provided upon the frame 10 is preferably adjustably mounted by means of a suitable standard 15, shown as removably secured to a support for a tracing surface or drawing-board 16, which standard provides means adapted to accommodate the prism and the board to objects at varying distances from the prism. The frame 10 also preferably has a lens-support for a lens 19 in front of the prism, for adjusting focal lengths or otherwise controlling the light entering the prism.

In order that the useful incident rays which come from an object, such as shown at 20, need not undergo extreme refraction, the incident refracting face of the prism is arranged to be approximately normal to the major portion of such rays when in use. This face corresponds to the vertical side $ac$ of the triangle $abc$. The incident rays which undergo internal reflections and refractions (as hereinafter more fully explained) emerge from the uncovered portion of the upper oblique side as noted above, so that an observer will perceive a virtual image of the object below the reflecting face, the plane of which image by proper adjustment may be made to be coincident with surface of the drawing-board 16 in order that it may be traced or otherwise reproduced.

The relation of the two refracting faces of the prism, in this invention, is such that an incident ray coming from the object 20 passes through the incident refracting face entering the prism and emerges without distortion or change from chromatic aberration. The necessary and sufficient condition to insure this result is that the emerging ray shall emerge at an angle to the normal of the face, which is the same as that which the incident ray makes with the normal to the incident face; or stated mathematically, where $i$ is angle of incidence, $e$ the angle of emergence, $r_1$ the angle of the entering refracted ray, $r_2$ the angle of the emerging refracted ray, and $\mu$ the index of refraction, the equations relating to these angles are:

$$\frac{\sin i}{\sin r_1} = \mu \quad (1)$$

$$\frac{\sin r_2}{\sin e} = \frac{1}{\mu} \quad (2)$$

From equation (2) we then have $$e = \sin^{-1}(\mu \sin r_2) \quad (3)$$

Now it can be shown that, in order that $r_1 = r_2$, the angles of the prism must be so proportioned that $$\angle cab = 2(\angle cba) \quad (4)$$

that is, the angle at the vertex must be twice the rear base angle or approximately so. When this condition is fulfilled, $r_1$ may be substituted for $r_2$ in (3) which becomes, by virtue of the relation in (1), the following:

$$e = \sin^{-1}(\sin i)$$
$$= i \quad (5)$$

Thus when the sides of the prism are proportioned as required in (4) the desired relation of the incident and emergent rays, which is stated by (5), follows.

The desired proportions of the sides for the prism represented by triangle $abc$ are had when $$\angle cab = 60°$$
$$\angle cba = 30°$$

Obviously, when $\angle bca$ is not required to be a right angle, many other angular relations of the sides of the prism satisfy the equation (4); but the relation of angles $cab$ and $cba$ just specified is convenient to manufacture and is hence illustrated.

Referring to Fig. 5, it will be seen that, by this arrangement, an obliquely incident ray 18, which makes an angle $i$ with the normal to the incident refracting face of the prism, is refracted into the ray 18' making an angle $r_1$ with the normal in the prism. This ray is reflected at the face $ab$ into the ray 19', which in turn is reflected at the surface 13 into the ray 19''. This ray makes an angle $r_2$ with the normal to the emergent surface, which angle is equal to $r_1$. Hence ray 18 emerges as ray 21 making an angle $e$ with its normal equal to the angle $i$.

The ray 17 is an example of a normal ray which the majority of useful rays entering the prism approach. By tracing its refractions and reflections as above, it will be seen to emerge as ray 21'. Now, if we project ray 21' backwardly from the emergent face of the prism, and denote this projection as 17'', and then similarly project a second ray proceeding from the same point in the object as ray 17, then where these two projections intersect will be defined a point in the virtual image of the object 20. This second ray is indicated at 22, which emerges as ray 23, its projected portion being shown at 23'' and intersecting with 17'' at a point on the drawing-board 16 where the virtual image is to be traced.

From the figure, it is seen that obliquely incident rays, like ray 18, approach an upper limit of the field of obliquely incident rays from the object which define the upper visible edge of the image; similarly there is a lower limit to the obliquely incident rays coming from the lower edge. These limits are, of course, determined by the index of refraction, such limit being reached when the angle of incidence is so great that there is total reflection within the prism whereby the ray fails to emerge.

By the arrangement here provided, it will be observed that the prism may be rotated without displacing the image; this enables different portions of the object to be brought into view. Such rotation of the prism is frequently desirable where a large object is to be viewed. Accordingly the supporting frame 10 is preferably provided with a thumb screw 25 adapted to effect this rotation.

In operation, the camera lucida of the present invention is adapted to be set up for viewing objects, such as indicated at 20 at close or far range; and the cone or sheaf of useful rays from the objects which enter the prism and emerge so as to reach the eye of the observer, approximate closely that of the normal to the incident face of the refracting prism. Consequently the light-intensity of these rays is diminished relatively little and they thereby form an image having good definition. Taking a normal ray as an average ray, it will be seen that it emerges as an angle to itself when projected which is materially greater than a right angle, i. e., the emerging ray is inclined obliquely away from the vertical at an angle relatively convenient of observation. In the case of the normal-horizontal ray 17, this is 30° from the vertical so that the emergent ray makes an angle of 120° with the incident ray when projected, thereby enabling the observer who is viewing the image on the board 16 to look down upon it from a natural position without unduly bending the head. The lens 19 is employed by such an observer in the well understood manner for adjusting the focal distance of the virtual image to the distance to the point of the stylus, crayon, or other tracing instrument, which can be seen at the edge of the lower face of the prism, after the manner illustrated in Fig. 6, whereby both may be clearly seen and the image in consequence readily traced.

By reason of the angular relation of the refracting surfaces here provided, the image will be free from distortion and chromatic aberration so that an accurate projection of the object can be readily produced by this invention.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In cameræ lucidæ, the combination with a drawing surface support, of a reflecting and refracting prism provided with means for mounting the same above said support and having its incident refracting face disposed to receive the major portion of useful rays in a direction approaching the normal, and an emergent refracting face arranged with respect to the incident face such that the emerging rays emerge substantially normally from it and meet the incident rays when projected at an angle materially greater than a right angle.

2. In cameræ lucidæ, the combination with a drawing-surface support, of a triangular reflecting and refracting prism provided with means for mounting the same above said support and having its incident refracting face disposed to receive the major portion of useful rays in a direction approaching the normal, an emergent refracting face arranged with respect to the incident face substantially such that the emerging rays emerge substantially normally from it and meet the incident rays when projected at an angle materially greater than a right angle, and a lower reflecting face arranged with respect to said refracting faces in a manner such that the refractive distortion produced within the prism is compensated for, whereby an undistorted virtual image appears below the prism.

3. In cameræ lucidæ, the combination with a drawing-surface support, of a triangular reflecting and refracting prism provided with means for mounting the same above said support and having its incident refracting face disposed to receive the major portion of useful rays in a direction approaching the normal, an emergent refracting face arranged with respect to the incident face substantially such that the emerging rays emerge substantially normally from it and meet the incident rays when projected at an angle materially greater than a right angle, and a lower reflecting face arranged to make an angle with said emergent refracting face which is related to the angle between said refracting faces such that distortion and the effects of chromatic aberration are avoided in the virtual image produced below said reflecting face.

4. In cameræ lucidæ, the combination with a drawing-surface support, of a triangular reflecting and refracting prism provided with means for mounting the same above said support and having its incident refracting face disposed to receive the major portion of useful rays in a direction approaching the normal, an emergent refracting face arranged with respect to the incident face substantially such that the emerging rays emerge substantially normally from it and meet the incident rays when projected at an angle materially greater than a right angle, and a lower reflecting face arranged to make an angle with said emergent refracting face which is substantially one-half the angle in the prism made at the intersection of said refracting faces whereby an undistorted virtual image appears below said prism in a plane substantially parallel to the plane of the emergent refracting face.

In testimony whereof I affix my signature.

DARRAGH DE LANCEY.